United States Patent
Lee et al.

(10) Patent No.: US 7,174,475 B2
(45) Date of Patent: Feb. 6, 2007

(54) METHOD AND APPARATUS FOR DISTRIBUTING A SELF-SYNCHRONIZED CLOCK TO NODES ON A CHIP

(75) Inventors: Hyun Lee, Ladera Ranch, CA (US); Han Nguyen, Allentown, PA (US); Lai Q. Pham, San Diago, CA (US)

(73) Assignee: Agere Systems Inc., Allentown, PA (US)

( * ) Notice: Subject to any disclaimer, the term of this patent is extended or adjusted under 35 U.S.C. 154(b) by 1139 days.

(21) Appl. No.: 09/785,604

(22) Filed: Feb. 16, 2001

(65) Prior Publication Data

US 2002/0116656 A1 Aug. 22, 2002

(51) Int. Cl.
*G06F 1/04* (2006.01)

(52) U.S. Cl. .............. 713/503; 713/400; 713/600; 327/233

(58) Field of Classification Search ........ 713/400, 713/401, 500, 501, 502, 503, 600; 327/233, 327/234, 235, 236, 237, 243, 244; 375/354, 375/355, 356, 358; 716/5, 6
See application file for complete search history.

(56) References Cited

U.S. PATENT DOCUMENTS

| | | | | |
|---|---|---|---|---|
| 5,210,700 A | * | 5/1993 | Tom .............................. | 716/6 |
| 5,268,656 A | * | 12/1993 | Muscavage ................ | 331/45 |
| 5,298,866 A | * | 3/1994 | Kaplinsky .................. | 327/261 |
| 5,410,491 A | * | 4/1995 | Minami ......................... | 716/6 |
| 5,442,776 A | * | 8/1995 | Masleid et al. ............ | 713/503 |
| 5,648,913 A | * | 7/1997 | Bennett et al. ................ | 716/6 |
| 5,812,835 A | * | 9/1998 | Ruuskanen .................. | 713/503 |
| 6,219,384 B1 | * | 4/2001 | Kliza et al. .................. | 375/258 |
| 6,229,861 B1 | * | 5/2001 | Young ......................... | 375/356 |

FOREIGN PATENT DOCUMENTS

JP 10301663 A * 11/1998

OTHER PUBLICATIONS

Johnson, M.G. and Hudson, E.L., "A Variable Delay Line PLL for CPU-Coprocessor Synchronization," Oct. 1998, IEEE Journal of Solid-State Circuits, vol. 23, Issue 5, pp. 1218-1223.*

* cited by examiner

*Primary Examiner*—Thuan Du

(57) ABSTRACT

A method and apparatus are disclosed for dynamically reducing clock skew among various nodes on an integrated circuit. The disclosed clock skew reduction technique dynamically estimates the clock delay to each node and inserts a corresponding delay for each node such that the clock signals arriving at each node are all in phase with a global clock (or 180° out of phase). Delays attributable to both the wire RC delays and the clock buffer delays are addressed. A feedback path for the clock signal associated with each node allows the round trip travel time of the clock signal to be estimated. When the length of the feedback path matches the length of the primary clock path, the clock skew present at the corresponding node can be estimated as fifty percent (50%) of the round trip delay time. Dynamic adjustments to the delay control circuit are permitted as operating conditions shift. Clock signals arriving at individual nodes on the integrated circuit remain in phase with the global PLL clock (PCK), regardless of variations in the operating voltage or temperature (or both).

15 Claims, 5 Drawing Sheets

300

METHOD AND APPARATUS FOR DISTRIBUTING A SELF-SYNCHRONIZED CLOCK TO NODES ON A CHIP

CROSS-REFERENCE TO RELATED APPLICATIONS

The present invention is related to U.S. patent application Ser. No. 09/788,582, entitled "Method and Apparatus far Transferring Multi-Source/Multi-Sink Control Signals Using a Differential Signaling Technique," U.S. patent application Ser. No. 09/785,602, entitled "Method and Apparatus for Distributing Multi-Source/Multi-Sink Control Signals Among Nodes on a Chip," U.S. patent application Ser. No. 09/785,653, entitled "Bidirectional Bus Repeater for Communications on a Chip," and U.S. patent application Ser. No. 09/785,592, entitled "On-Chip Method and Apparatus for Transmission of Multiple Bits Using Quantized Voltage Levels," each filed contemporaneously herewith, assigned to the assignee of the present invention and incorporated by reference herein.

FIELD OF THE INVENTION

The present invention relates generally to clock distribution techniques, and more particularly, to clock distribution techniques for synchronizing operations on a single chip.

BACKGROUND OF THE INVENTION

As the clock frequency increases at which integrated circuits operate, the clock period decreases such that there is less time available to accommodate integrated circuit trace propagation delays in the clock signal. A high frequency clock signal is typically generated by a clock generation circuit using a low frequency crystal as a reference clock signal. The clock generation circuit includes a frequency synthesizer to produce the high frequency clock signal output. The high frequency clock signal is routed through traces on an integrated circuit to devices such as a cache controller, processors, and random access memories. It is desirable to have clock signals arrive at all devices at precisely controlled times, which may be or may not be simultaneous. The devices receiving the clock signal are located at various distances from the clock generation circuit resulting in traces of different length over which the clock signal must propagate.

Differences in clock signal arrival time at various devices due to propagation delays is often referred to as clock skew. An excessive clock skew among clocked gates can cause asynchronous data transfers and produce unpredictable results, leading to the failure of a device. While clock skew can be reduced but typically not eliminated by integrated circuit layout, it is more desirable to lay out an integrated circuit efficiently to package as many components as possible into a given area. Thus, concerns over clock signal propagation delays must be addressed in another manner.

The clock skew in an integrated circuit device is usually composed of two parts, namely, mismatch in resistive-capacitive (RC) delays along the various paths of the clock distribution wires and mismatch in the clock buffer delays along the paths. Generally, it is relatively easy to separately match either the clock buffer delays or the RC delays. However, since the wire resistance and capacitance (RC delay components) vary differently from the gate transconductance and the parasitic diode capacitance (clock buffer delay components) under various processing technologies and operating conditions, matching both components together is not an easy task. Furthermore, since the RC delay values depend on the physical layout of the device, an integrated circuit designer can only guarantee the minimum clock skew requirement by tuning the RC delay along the clock tree once the physical design (layout) stage is essentially complete. In fact, in spite of all the tuning work, the minimum clock skew is best guaranteed for only a narrow operation range.

Recently, integrated circuit (IC) manufacturers have begun producing single chips containing multiple device cores, such as multiple memory devices, micro-controllers, microprocessors and digital signal processors (DSPs), that were traditionally mounted on a PCB and interconnected by one or more busses on the PCB. Such a single chip is commonly referred to as a system-on-a-chip (SoC). SoCs incorporate one or more busses to provide data paths to interconnect the multiple core devices on the chip, often referred to as "nodes," and utilize a global clock to synchronize the operations of the various nodes. The clock skew problem is more prominent in case of an SoC device where the RC delays on different clock branches can differ by more than an order of magnitude due to a wide range of clock wire lengths.

A number of techniques have been proposed or suggested for clock signal arrival time at various devices on a chip. FIG. 1 illustrates a first conventional technique where the clock skew is minimized by physically matching the clock wire length of each branch 110-1, 110-2 of the distribution network 120 for a global clock 105. While the wire length matching technique illustrated in FIG. 1 effectively reduces the clock skew, the technique only balances the delays attributed to RC components among the different clock branches 110-1, 110-2. In addition, whenever there is a modification to the layout, there must be a corresponding modification to layout of the clock tree 120, thereby extending the design time.

FIG. 2 illustrates another conventional technique for reducing the clock skew by balancing the clock buffer delay. A reference clock (REF-CK) signal generated by a reference block 205 is applied to the phase locked loop/delay locked loop (PLL/DLL) 220-n of each block 210-n along with the feedback clock (FB-CK) to control the PLL clock (PCK) delay through the PLL/DLL 220-n. The clock signal produced by the PLL/DLL 220-n synchronizes the data output from Block-1 210-1 through the data buffer 230-n with the data output from the Reference-block 205. Clock skew is minimized by matching the clock buffer delay in each block 210-n using clock buffers 240-n. The size of each buffer 240-n is fixed once the layout is established. For a more detailed description of the clock buffer delay matching technique, see, for example, Mark Johnson and Edwin Hudson, "A Variable Delay Line PLL for CPU-Coprocessor Synchronization," IEEE J. of Solid State Circuits, Vol. 23, No. 5 (October 1988). While the clock buffer matching technique illustrated in FIG. 2 effectively reduces the clock skew, the technique only balances the delays attributed to clock buffer delay components and ignores the RC components. If there is a substantial RC delay on the REF-CK signal line in FIG. 2 from the reference-block 205 to block-1 (210-1), the I/O signals from these two blocks would not synchronize.

FIG. 3 discloses another clock skew reduction technique that assigns a particular phase A, B, C of a multi-phase ring oscillator 300 to the input of each clock driver 310-n based on the estimated clock wire RC delay from each clock driver 310-n to the destination module (not shown). The assignment of a particular phase A, B, C to each clock driver 310-n is done such that the phase difference among different clock drivers 310-n are equal to the differences among the RC delays on the clock wires which are driven by the same group of clock drivers. For a more detailed discussion of this clock skew reduction technique, see, U.S. Pat. No. 5,268, 656 issued to Muscavage, incorporated by reference herein. FIG. 4 illustrates a timing diagram of an implementation of the circuit shown in FIG. 3. While the clock skew reduction technique illustrated in FIG. 3 effectively reduces the clock skew, the technique only balances the delays attributed to RC components.

A need therefore exists for improved techniques for reducing clock skew that address both the wire RC delays and the clock buffer delays. A further need exists for a self-synchronized clock distribution network that uses a remote clock feedback. Yet another need exists for an automatic clock skew control scheme that inserts an appropriate delay on the output of a clock generator such that the arrival times of the clock signal at each node may be coordinated.

SUMMARY OF THE INVENTION

Generally, a method and apparatus are disclosed for dynamically reducing clock skew among various nodes on an integrated circuit. The disclosed clock skew reduction technique dynamically estimates the clock delay to each node and inserts a different amount of delay for each node such that the corresponding clock signals arriving at each node are all in phase with the PLL (or 180° out of phase). The period of the output of the clock generator for each node is fixed and the phase is adjusted to account for the clock generator output delay and RC delay (or clock insertion time). In this manner, delays attributable to both the wire RC delays and the clock buffer delays are addressed.

The present invention provides a feedback or return path for the clock signal associated with each node that allows the round trip travel time of the clock signal to be estimated. The round trip travel time includes delays attributable to both the clock generator output delay and any RC delays along the path. When the length of the feedback path matches the length of the primary clock path, the clock skew present at the corresponding node can be estimated as fifty percent (50%) of the round trip delay time. Thus, if the clock signal for each node is delayed by a corresponding amount, the corresponding clock signals arriving at each node will be phase aligned with the PLL (or 180° out of phase).

The present invention permits dynamic adjustments to the delay control circuit as operating conditions shift by feeding back the destination clock and estimating the round trip delay time. Thus, clock signals arriving at individual nodes on the integrated circuit remain in phase with the global PLL clock (PCK), regardless of variations in the operating voltage or temperature (or both). In addition, the dynamic reduction of clock skew eliminates the need for post layout adjustments to the clock network.

A more complete understanding of the present invention, as well as further features and advantages of the present invention, will be obtained by reference to the following detailed description and drawings.

DETAILED DESCRIPTION

Figure 1:
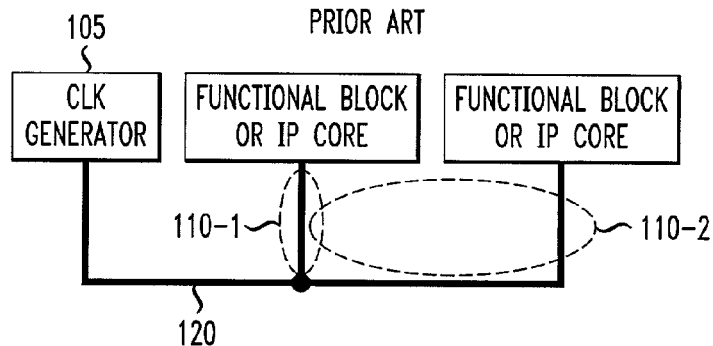
FIGS. 1 through 3 illustrate conventional clock skew reduction techniques.
Figure 2:
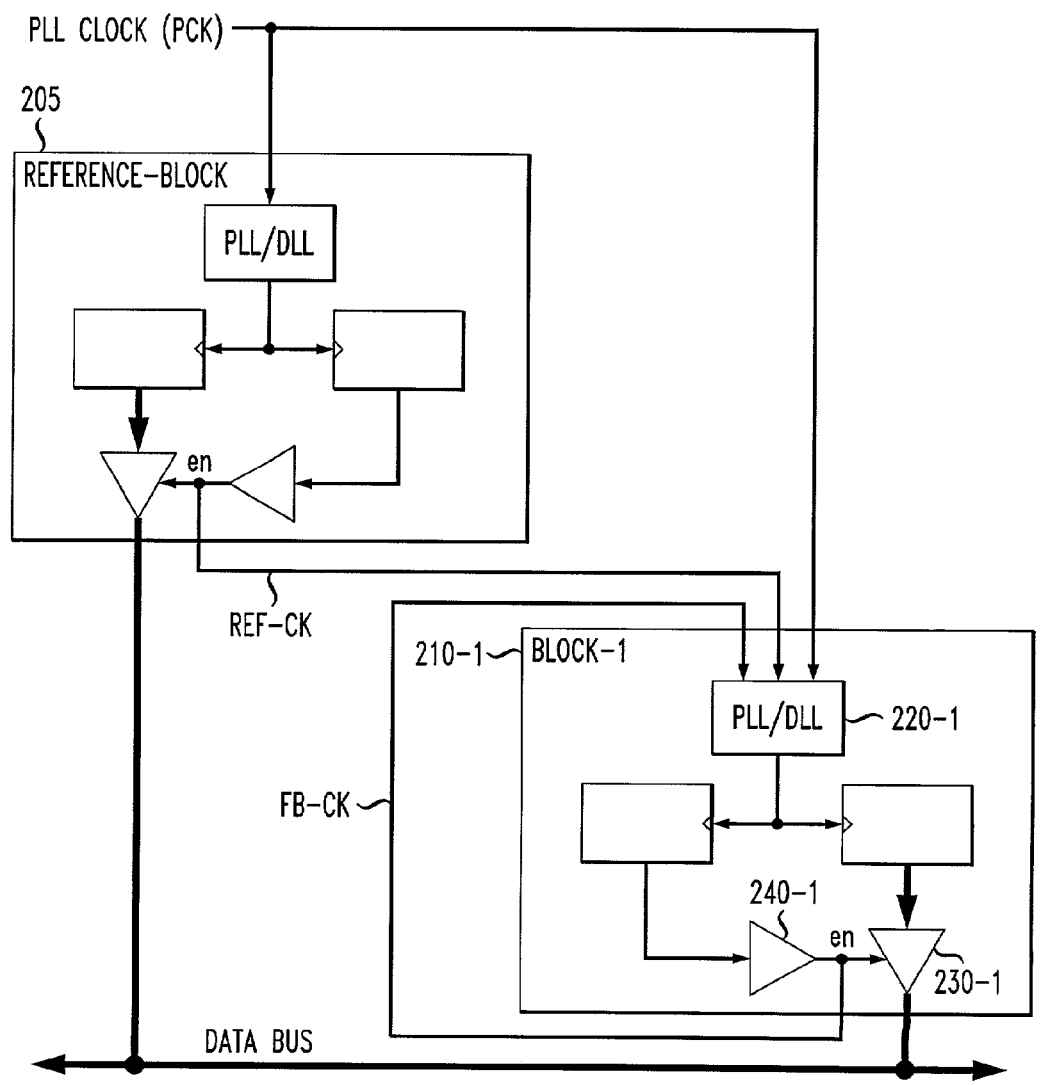
Figure 3:
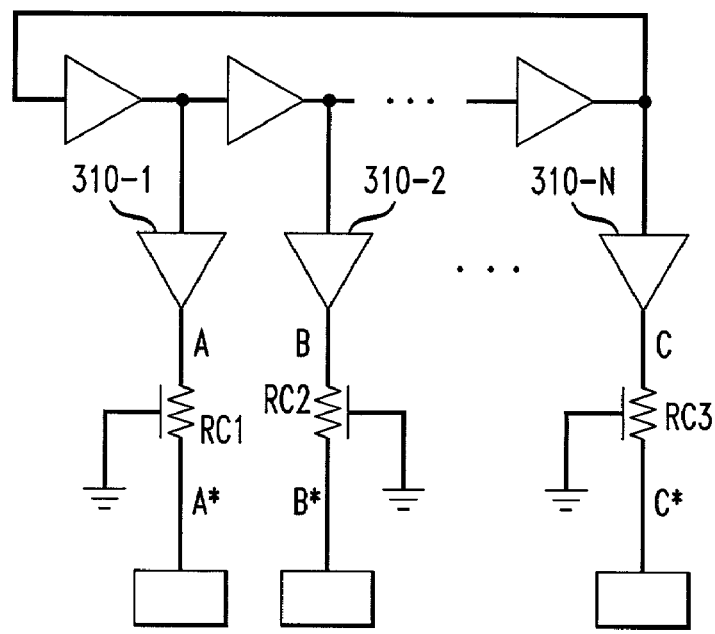
Figure 4:
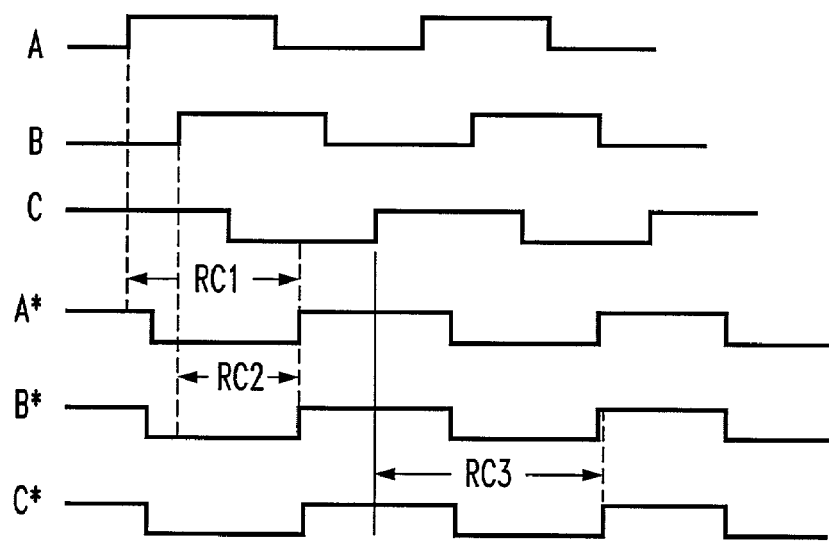
FIG. 4 illustrates a timing diagram of an implementation of the clock skew reduction circuit shown in FIG. 3.
Figure 5:
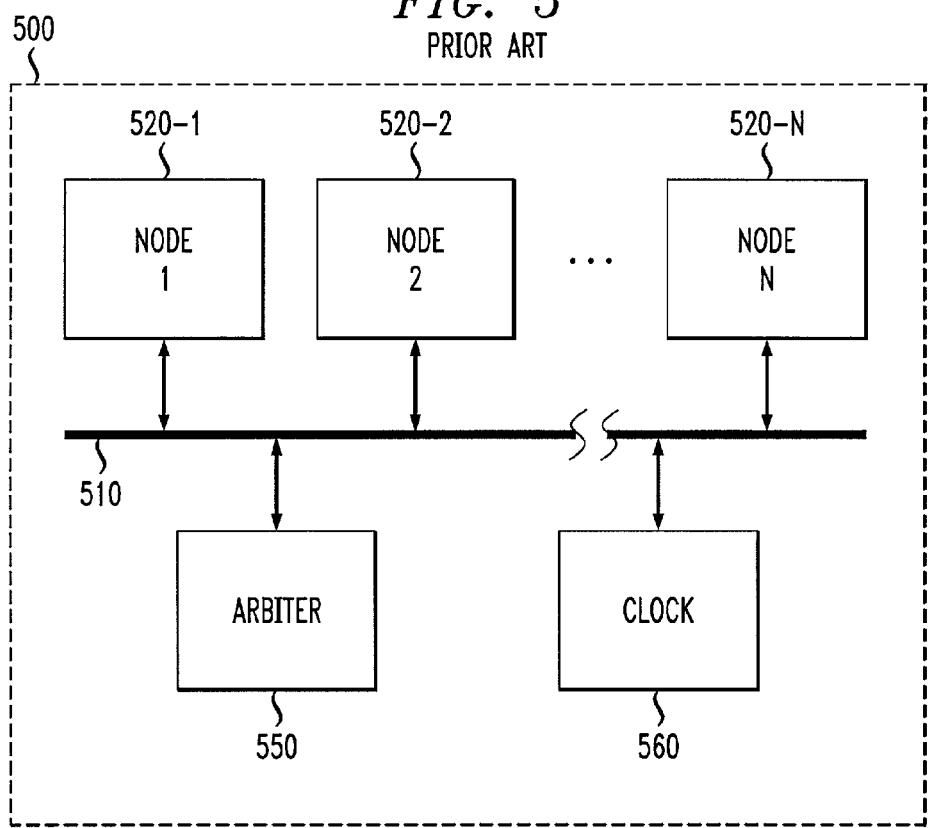
FIG. 5 is a schematic block diagram illustrating a conventional SoC where the present invention can operate.

FIG. 5 is a schematic block diagram illustrating an exemplary SoC 500 where the present invention can operate. The exemplary SoC 500 includes a bus 510 that interconnects various nodes 520-1 through 520-N (multiple core devices), collectively referred to as nodes 520, on the chip 500. The nodes 520 may be embodied, for example, as memory devices, micro-controllers, microprocessors and digital signal processors (DSPs). When an SoC 500 includes multiple nodes 520 communicating over a common bus 510, an Arbiter 550 is often used to determine which node 520 should actively drive the bus 510 at a particular time. Multi-source/multi-sink control signals, such as acknowledgement (ACK), data-valid, interrupt and error signals, are often employed to control communications on the SoC bus 510. All of the various nodes 520 and the Arbiter 550 typically operate synchronously with respect to a common clock 560.

According to one feature of the present invention, an automatic clock skew control scheme is disclosed that inserts an appropriate delay on the output of the clock generator 560 such that the output of clock generator 560 leads the local PLL clock at each node 520 by the amount of the clock wire RC delay time (or the clock insertion time). Thus, the destination clocks arrive at each node 520 in phase with the PLL clock. The period of the output of the clock generator 560 is fixed and the phase is adjusted to account for the clock generator output delay and RC delay (or clock insertion time).

Figure 6:
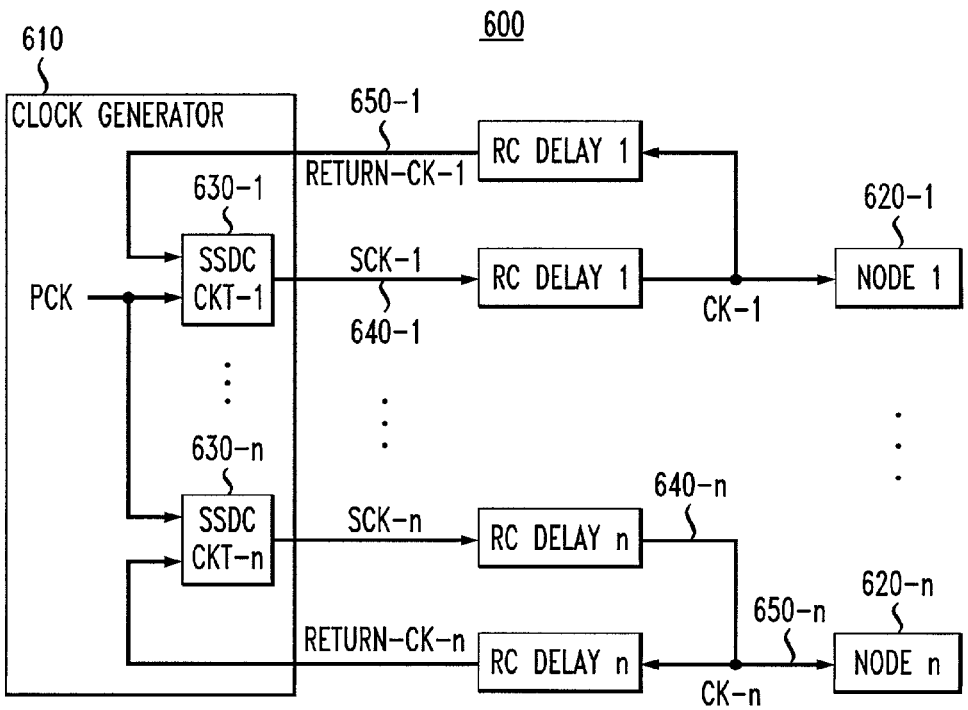
FIG. 6 illustrates a clock distribution network in accordance with the present invention.

FIG. 6 illustrates a clock distribution network 600 in accordance with the present invention. The clock distribution network 600 distributes a synchronized clock to various nodes 620-1 through 620-n on a chip. While the present invention is illustrated herein in the environment of an SoC chip, the present invention is applicable to any integrated circuits, including PCB devices. In addition, while the present invention is illustrated herein to control clock skew among various nodes on a chip, the present invention can be applied to control clock skew within a given node 520 as well.

As shown in the exemplary embodiment of FIG. 6, a clock generator 610 generates a PLL clock (PCK) that is distributed to a number of exemplary nodes 620-n using a common clock network 600. The clock generator 610 includes a self synchronizing delay circuit (SSDC) 630-1 through 630-n, hereinafter collectively referred to as SSDCs 630 and discussed further below in conjunction with FIG. 7, for each node 620-n. As discussed more fully below, each SSDC 630 inserts a different amount of delay for each node such that the corresponding clock signals CK-1 through CK-n arriving at each node 620 are all in phase with the PLL (or 180° out of phase). The PLL/DLL circuit (not shown) in each node 620 aligns the phase of the node clock with the input clock such that they are either in phase or 180° out of phase relative to each other. Thus, the present invention guarantees that all clocks in various nodes 620 are in phase with the PLL clock (PCK).

The wires 640-n that make up the clock network 600 have a significant RC component that is the limiting factor in the rate at which information may be transferred. The present invention provides a return path 650-n for the clock signal associated with each node 620 that allows the round trip travel time of the clock signal to be estimated. When the length of the return path 650-n is matched to the length of the primary clock path 640-n, the clock skew present at the corresponding node 620-n can be estimated as fifty percent (50%) of the round trip delay time. The wires 650-n that make up the return path of the clock network 600 also have a significant RC component.

Figure 7:
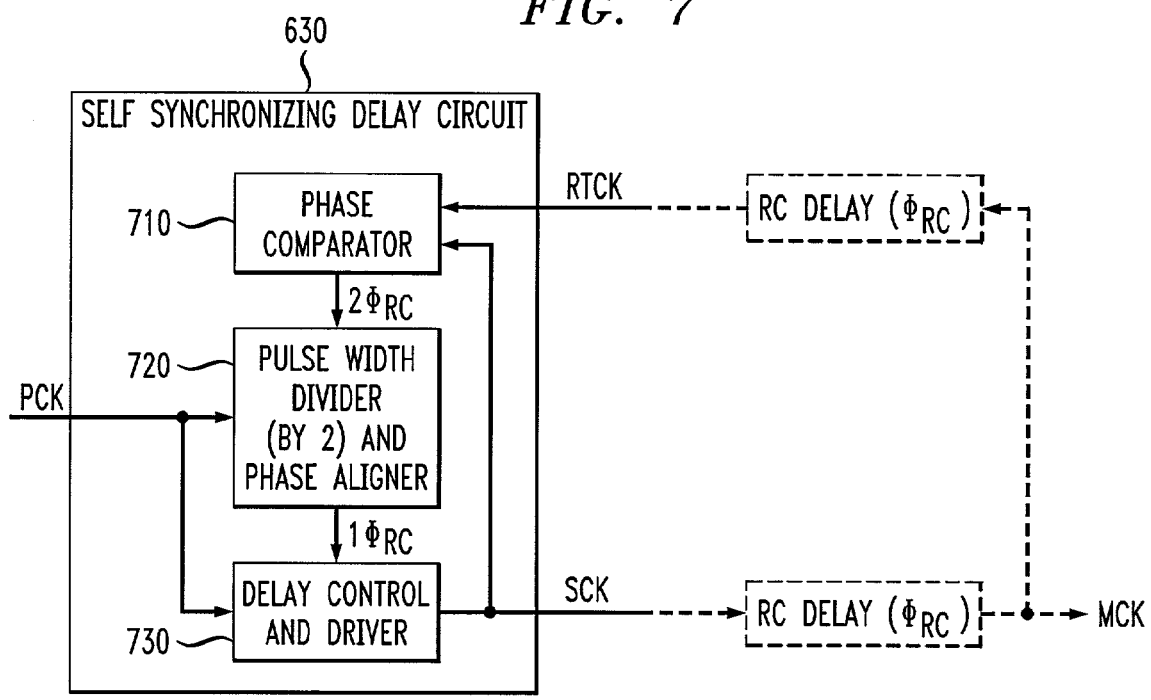
FIG. 7 is a schematic block diagram illustrating features of the self-synchronizing delay circuit of FIG. 6 in further detail.

FIG. 7 is a schematic block diagram illustrating features of an exemplary SSDC 630 in further detail. Each SSDC 630 includes a phase comparator 710 that measures the time difference between the clock signal SCK generated by the clock generator 610 and the return clock (RTCK). The phase comparator 710 produces a pulse for every cycle that is $2\Phi_{RC}$, corresponding to the round trip delay time of the return clock (RTCK).

Figure 8:
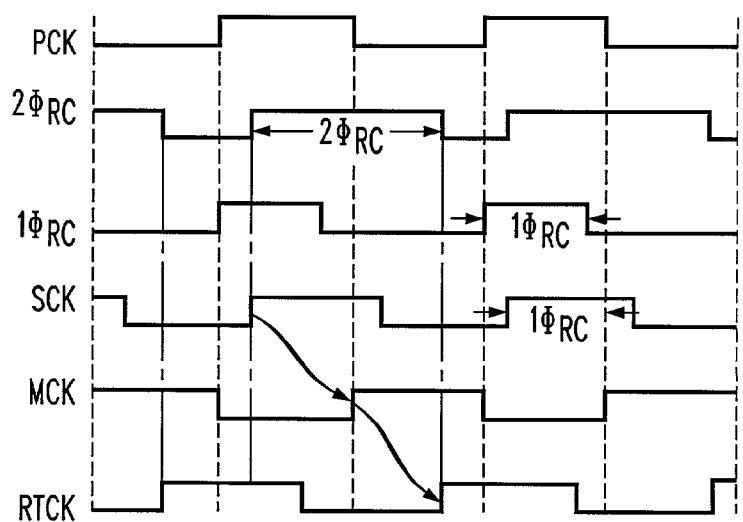
FIG. 8 is a timing diagram illustrating the relative relationship of the various signals shown in FIG. 7.

The $2\Phi_{RC}$ pulse is applied to a pulse width divider (by 2) and phase aligner 720 that processes the $2\Phi_{RC}$ pulse to produce a $1\Phi_{RC}$ pulse having a rising edge that is in phase with the PLL clock (PCK). A delay control and driver 730 produces the clock signal SCK. The clock signal SCK corresponds to the PLL clock (PCK) delayed by an amount equal to $1\Phi_{RC}$. Thus, the clock signal SCK effectively leads the PLL clock (PCK) by $1\Phi_{RC}$ and thereby aligns the clock signal CK-n arriving at each node 520 with the PLL clock (PCK). FIG. 8 is a timing diagram illustrating the relative relationship of the various signals shown in FIG. 7.

Figure 9:
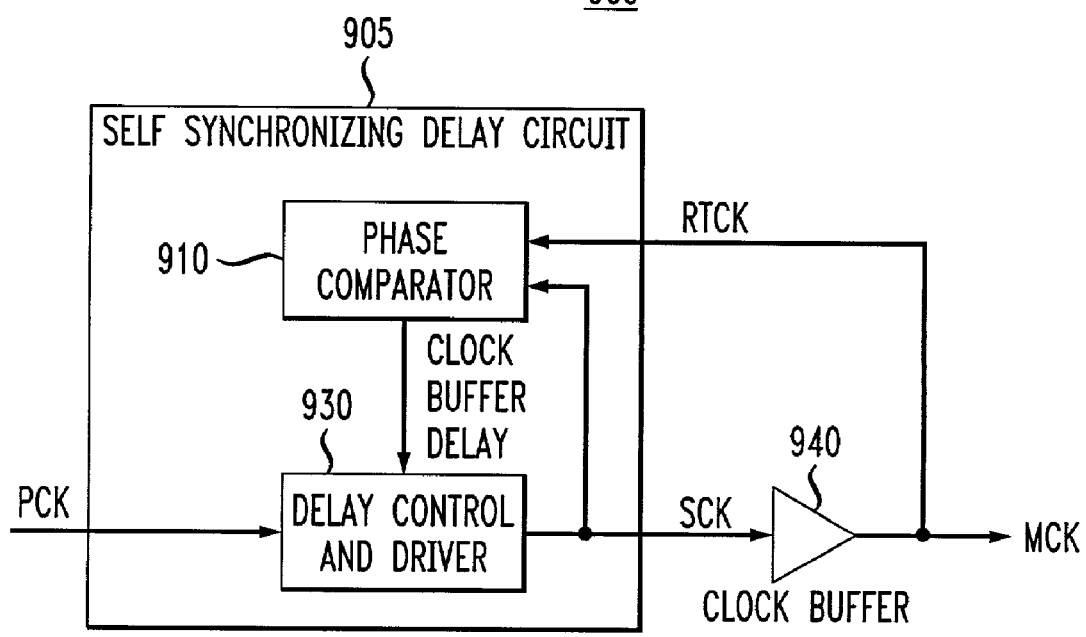
FIG. 9 illustrates an embodiment of the invention that can be employed to control clock skew within a given node.
Figure 10:
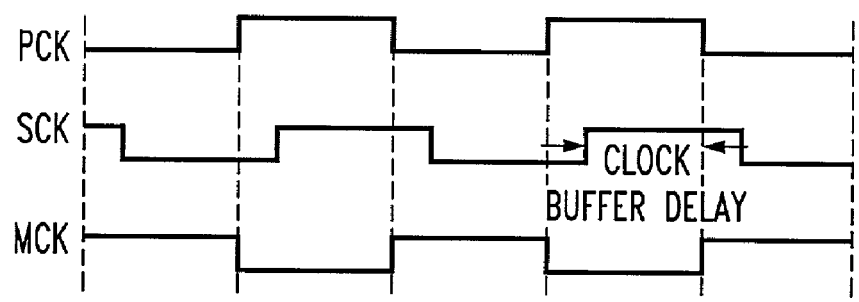
FIG. 10 is a timing diagram illustrating the relative relationship of the various signals shown in FIG. 9.

It is again noted that the present invention can be applied to control clock skew within a given node 620. More specifically, the present invention module can be applied to control clock skew within a node 620 where the RC delay on the clock line is rather insignificant due to short wire length. FIG. 9 illustrates an embodiment of the invention that can be employed to control clock skew within a given node 900 to replace a traditional PLL. As shown in FIG. 9, the SSDC 905 for use within a node 900 includes a phase comparator 910 that measures the time difference between the clock signal SCK generated from the PLL clock (PCK) and the return clock (RTCK). The phase comparator 910 produces a pulse corresponding to the delay of the clock buffer(s) 940. The pulse corresponding to the clock buffer delay is applied to delay control and driver 930 that produces the clock signal SCK. Since there is no RC delay on the clock wire, the pulse width divider (by 2) and phase aligner 720 from the internode skew reduction implementation of FIG. 7 can be omitted. The clock signal SCK corresponds to the PLL clock (PCK) delayed by an amount equal to the clock buffer delay. Thus, the clock signal MCK effectively leads the PLL clock (PCK) by the clock buffer delay amount and thereby aligns the clock signal MCK-n with the PLL clock (PCK). FIG. 10 is a timing diagram illustrating the relative relationship of the various signals shown in FIG. 9.

It is to be understood that the embodiments and variations shown and described herein are merely illustrative of the principles of this invention and that various modifications may be implemented by those skilled in the art without departing from the scope and spirit of the invention.

We claim:

1. A method for distributing a clock signal generated by a clock generator to a plurality of nodes on an integrated circuit, said method comprising the steps of:
    estimating a clock delay for each of said nodes, wherein said clock delay includes clock generator output delays and resistive-capacitive delays; and
    adjusting said clock signal for each node based on said estimated clock delay such that said clock signal arrives at each of said nodes with an aligned phase.

2. The method of claim 1, wherein said estimating step further comprises the step of estimating a round trip delay time for said clock signals.

3. The method of claim 2, wherein said round trip delay time is obtained using a primary clock path and a return clock path.

4. The method of claim 1, wherein said integrated circuit is a system-on-chip.

5. The method of claim 1, wherein said integrated circuit is a printed circuit board.

6. A method for distributing a clock signal generated by a clock generator to a plurality of nodes on an integrated circuit, said method comprising the steps of:
    providing a feedback clock path for each of said nodes, each of said feedback clock paths having an associated primary clock path that distributes said clock to each node;
    determining a round trip delay time of said clock signal on each of said primary clock paths and associated feedback clock path;
    estimating a clock delay for each of said nodes using said round trip travel time; and
    adjusting said clock signal for each node based on said estimated clock delay such that said clock signal arrives at each of said nodes with an aligned phase.

7. The method of claim 6, wherein said clock delay includes a clock generator output delay and a resistive-capacitive delay.

8. The method of claim 6, wherein said round trip delay time is obtained using the primary clock path and a return clock path.

9. The method of claim 6, wherein said integrated circuit is a system-on-chip.

10. The method of claim 6, wherein said integrated circuit is a printed circuit board.

11. A network for distributing a clock signal generated by a clock generator to a plurality of nodes on an integrated circuit, said network comprising:
    a primary clock path that distributes said clock to each node;
    a feedback clock path associated with each of said primary clock paths;
    a phase comparator for determining a round trip delay time of said clock signal on each of said primary clock paths and associated feedback clock path; and
    a delay driver for adjusting said clock signal for each of said nodes based on an estimated clock delay for each of said nodes based on said round trip travel time, such that said clock signal arrives at each of said nodes with an aligned phase.

12. The network of claim 11, wherein said clock delay includes a clock generator output delay and a resistive-capacitive delay.

13. The network of claim 11, wherein said round trip delay time is obtained using the primary clock path and a return clock path.

14. The network of claim 11, wherein said integrated circuit is a system-on-chip.

15. The network of claim 11, wherein said integrated circuit is a printed circuit board.

* * * * *